(12) United States Patent
Rumpel et al.

(10) Patent No.: US 9,045,170 B2
(45) Date of Patent: Jun. 2, 2015

(54) REAR-WHEEL DRIVE, PLUG-IN HYBRID ELECTRIC VEHICLE MODULAR SUBFRAME ASSEMBLY AND METHOD

(71) Applicant: Fisker Automotive and Technology Group, LLC, Costa Mesa, CA (US)

(72) Inventors: Manfred Rumpel, Costa Mesa, CA (US); Mike Jones, Costa Mesa, CA (US); Art Goudie, Costa Mesa, CA (US); Bill Stinnett, Costa Mesa, CA (US); Amritpal Dhadiala, Costa Mesa, CA (US)

(73) Assignee: Fisker Automotive and Technology Group LLC, Costa Mesa, CA (US)

( * ) Notice: Subject to any disclaimer, the term of this patent is extended or adjusted under 35 U.S.C. 154(b) by 0 days.

(21) Appl. No.: 14/278,231

(22) Filed: May 15, 2014

(65) Prior Publication Data
US 2015/0068832 A1    Mar. 12, 2015

Related U.S. Application Data

(63) Continuation of application No. 13/656,525, filed on Oct. 19, 2012, now abandoned.

(60) Provisional application No. 61/550,006, filed on Oct. 21, 2011.

(51) Int. Cl.
| | |
|---|---|
| *B60K 1/00* | (2006.01) |
| *B60K 15/063* | (2006.01) |
| *B62D 25/08* | (2006.01) |
| *B60K 15/07* | (2006.01) |
| *B62D 65/02* | (2006.01) |

(52) U.S. Cl.
CPC ............. *B62D 25/08* (2013.01); *B60K 15/07* (2013.01); *B60K 1/00* (2013.01); *B62D 65/02* (2013.01)

(58) Field of Classification Search
CPC .......... B60K 1/00; B60K 6/00; B60K 15/00; B60K 15/03; B60K 15/03006; B60K 15/063; B60K 15/067; B60K 15/07; B60K 15/073
USPC .......... 180/55, 56, 58, 60, 62, 299, 300, 69.4, 180/69.5
See application file for complete search history.

(56) References Cited

U.S. PATENT DOCUMENTS

| | | | |
|---|---|---|---|
| 4,416,461 | A | 11/1983 | Hayashi et al. |
| 5,110,177 | A | 5/1992 | Akio |
| 5,195,780 | A | 3/1993 | Inoue et al. |
| 5,405,167 | A | 4/1995 | Lee |
| 5,542,707 | A | 8/1996 | Kamei et al. |
| 5,547,224 | A | 8/1996 | Kami et al. |
| 5,556,133 | A | 9/1996 | Oku et al. |

(Continued)

*Primary Examiner* — John Walters
(74) *Attorney, Agent, or Firm* — Duane Morris LLP

(57) ABSTRACT

A rear subframe assembly, for use in a vehicle, includes a first and second side member that are coupled to a front cross member, a lower cross member, and an upper cross member. First and second gussets are provided to reinforce joints between each of the first and second side members and the front cross member. A motor mount portion for mounting a motor thereon is located between the side members and includes a first and second motor bracket each coupled to the front cross member through an isolator and to one of the side members through an isolator, the isolators for isolating the motor from vibration. A fuel tank mounting portion for mounting a fuel tank onto the subframe member is also provided.

15 Claims, 11 Drawing Sheets

(56) References Cited

U.S. PATENT DOCUMENTS

| | | |
|---|---|---|
| 5,560,651 A | 10/1996 | Kami et al. |
| 5,562,308 A | 10/1996 | Kamei et al. |
| 6,003,900 A | 12/1999 | Hasegawa et al. |
| 6,357,769 B1 | 3/2002 | Omundson et al. |
| 6,866,295 B2 | 3/2005 | Ziech et al. |
| 7,063,355 B2 | 6/2006 | Hashimura |
| 7,207,600 B2 | 4/2007 | Beckmann et al. |
| 7,360,622 B2 * | 4/2008 | Lee et al. ............ 180/377 |
| 7,458,611 B2 | 12/2008 | Hashimura |
| 7,614,473 B2 * | 11/2009 | Ono et al. ............ 180/299 |
| 7,854,282 B2 | 12/2010 | Lee et al. |
| 7,874,395 B2 * | 1/2011 | Taji et al. ............ 180/300 |
| 8,522,909 B2 * | 9/2013 | Niina ............ 180/299 |

\* cited by examiner

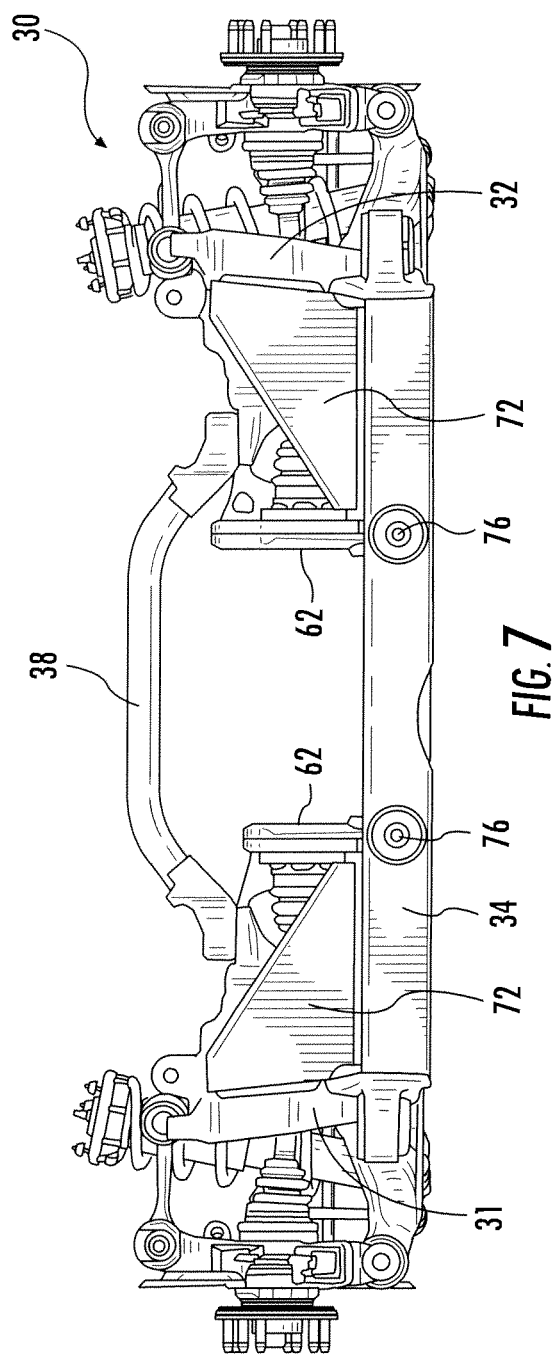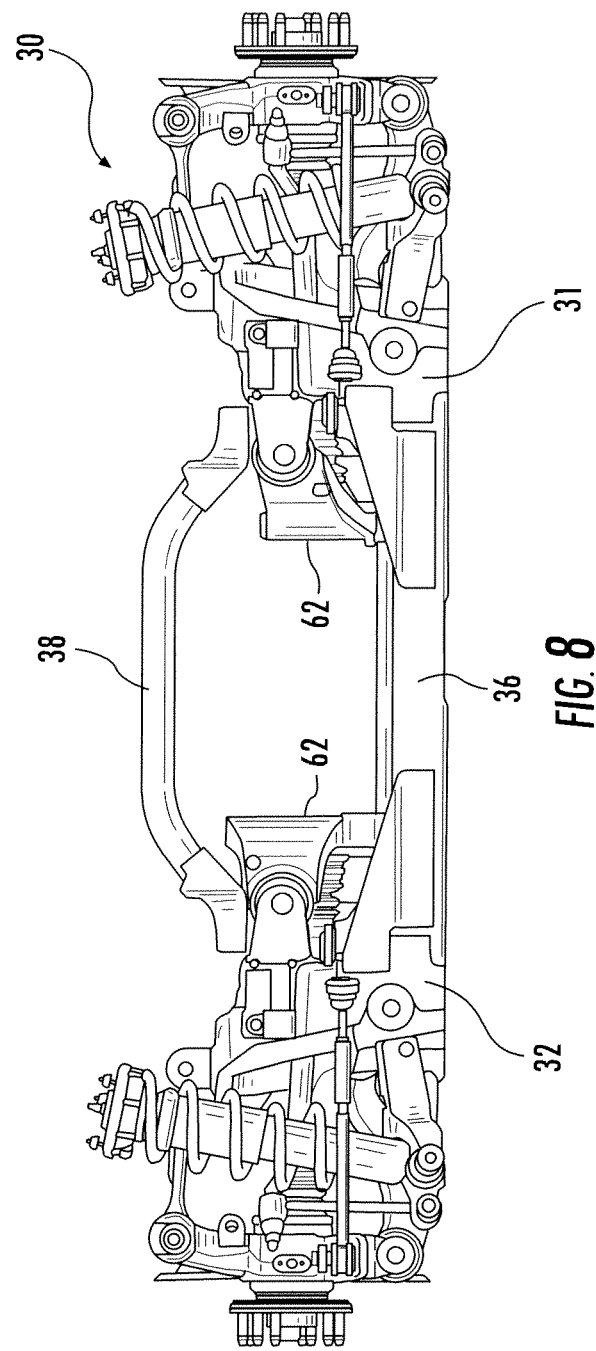

REAR-WHEEL DRIVE, PLUG-IN HYBRID ELECTRIC VEHICLE MODULAR SUBFRAME ASSEMBLY AND METHOD

CROSS REFERENCE TO RELATED APPLICATIONS

This application is a continuation of U.S. Ser. No. 13/656,525, filed Oct. 19, 2012, which claims the benefit of U.S. Provisional Patent Application No. 61/550,006 filed Oct. 21, 2011. The foregoing patent applications are incorporated by reference herein in its entirety.

BACKGROUND

The present disclosure relates generally to a subframe assembly for a vehicle, and more particularly to a modular subframe assembly for a plug-in hybrid electric vehicle (PHEV).

DESCRIPTION OF THE PRIOR ART

Vehicles, such as a passenger motor vehicle, include a suspension system for supporting the vehicle and isolating it from road variation, while providing desirable handling and maneuvering capabilities. Passenger vehicle body frames typically include a ladder-type construction or a unibody structure. Such known vehicle body structures have been used for many years and are well known in the art.

The demand for more safe and efficient vehicles has driven the automotive industry to reduce the weight of vehicles without reducing or sacrificing structural integrity. The need for safer vehicles also creates a demand for vehicles that are more able to withstand impact collisions, and which also have improved handling and driving performance. Various specific attempts have been made to substitute different materials for part or all of the vehicle frame. Although materials such as aluminum or composites have lightweight advantages, structural stiffness and/or integrity is typically sacrificed.

Fuel tanks for conventional vehicles have traditionally been mounted directly to a body structure of the vehicle. In the case of a PHEV, a traditional body-mounted fuel tank location seriously compromises the amount of space available for a drive battery. Therefore, there exists a need for a more suitable space for the fuel tank of a PHEV, which does not compromise the available space for a drive battery.

Another disadvantage associated with conventional vehicle frames and subassemblies relates to design space for vehicle components, which is restricted as a result of required design clearances for part variation and part movement. Design space is further restricted due to the isolating properties of rubber subframe mounts which allow a subframe to move. As a result of restricted design space, the size of a traditionally body-mounted fuel tank is accordingly restricted and the vehicle's effective drive distance is reduced. Therefore, there exists a need for a more suitable space for the fuel tank of a vehicle which allows for a larger fuel tank in order to accommodate more fuel and increase the vehicle's effective drive distance.

A further disadvantage associated with conventional vehicle frames relates to the method in which vehicle components are assembled to the vehicle frame. Typically, vehicle components, such as the vehicle driveline components and vehicle suspension components, are installed to the vehicle frame individually. As a result, the time it takes to fully assemble the vehicle is increased. Therefore, there exists a need for a method of assembling a subframe assembly to a vehicle frame assembly which reduces the overall time it takes to assemble the vehicle frame assembly.

SUMMARY

Accordingly, it is the object of the present disclosure to provide a subframe assembly for a vehicle that increases the space available for a fuel tank, thereby allowing the vehicle to accommodate a fuel tank with greater volume. A further object of the present disclosure is to provide a subframe assembly for a vehicle that can be easily assembled to the vehicle frame assembly, thereby reducing the overall assembly time and the number of steps it takes to assemble the vehicle frame assembly.

Generally, the present disclosure relates to a rear subframe assembly and architecture that represents a dramatic improvement over known devices. More particularly, the present disclosure relates to a rear subframe assembly for a rear-wheel drive PHEV. In various embodiments, compatibility with various electric driveline configurations, fuel tanks, powertrain components, and other vehicle components is greatly enhanced. In various embodiments, the structural stiffness and durability of the vehicle body frame is increased. In various embodiments, driveline isolation from noise and vibration is improved. In various embodiments, occupant and fuel tank protection is enhanced. In various embodiments, overall vehicle assembly is simplified and improved.

According to various embodiments, a rear subframe assembly for a vehicle comprises a first side member (left side member), a second side member (right side member), a front cross member, a lower cross member, an upper cross member, a first and second gusset, a motor mount portion, and a fuel tank mount portion. The first and second side members are positioned generally parallel to a longitudinal direction of the vehicle. The cross members are positioned generally normal to a longitudinal direction of the vehicle. The front cross member is positioned in a generally forward location of the rear subframe assembly, as the rear subframe assembly is configured to be mounted to a structure of a vehicle.

According to various embodiments, the first and second side members are coupled to the front cross member, the bottom cross member, and the top cross member.

According to various embodiments, the first gusset is coupled to the first side member and the front cross member, and a second gusset is coupled to the second side member and the front cross member. At least one function of the first and second gussets is to reinforce the joints defined by the first and second side members and the front cross member.

According to various embodiments, the motor mount portion is located between the first and second side members. The motor mount portion comprises a first motor bracket, a second motor bracket, a motor, and isolators. The first and second motor brackets are each coupled to the front cross member and either of the left or right side members through isolators. At least one function of the first and second motor brackets is to couple a motor thereon. At least one function of the isolators is to isolate the motor from vibration.

According to various embodiments, at least one function of the fuel tank mount portion is to provide support for a fuel tank. According to other embodiments, the fuel tank is disposed above the motor mount portion. The fuel tank mount portion may be concave-shaped to receive the fuel tank.

BRIEF DESCRIPTION OF THE DRAWINGS

FIG. 7 is a front view of a rear subframe assembly according to an embodiment of the disclosure.

FIG. 8 is a rear view of a rear subframe assembly according to an embodiment of the disclosure.

DETAILED DESCRIPTION OF THE EXEMPLARY EMBODIMENT(S)

Figure 1:
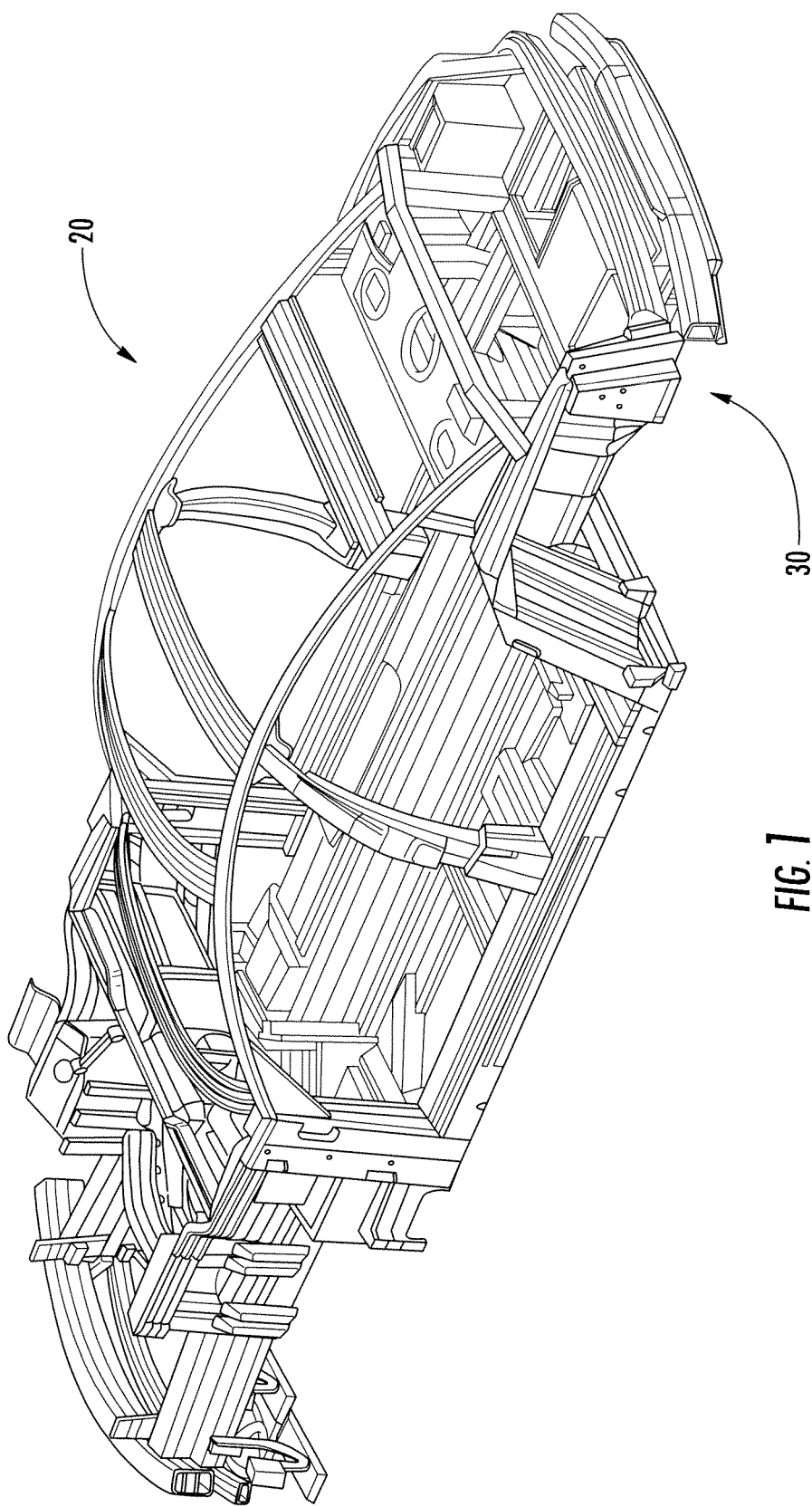
FIG. 1 is a perspective view of a vehicle body frame having a rear suspension subframe assembly according to an embodiment of the disclosure.

Referring to FIG. 1, a vehicle body frame 20 is shown. The vehicle body frame 20 includes a number of components, including a rear subframe assembly 30. It should be noted that the vehicle body frame 20 is shown for the four-door vehicle 10'. However, the features of the vehicle body frame 20 are meant to apply to the two-door vehicle 10 and other variations of passenger vehicles.

Referring now to FIGS. 2-13, the rear subframe assembly 30 is shown. The rear subframe assembly 30 includes two side members 31, 32 (left and right), a front cross-member 34, a lower cross-member 36, and an upper cross-member 38. The two side members 31, 32 are positioned parallel to a longitudinal direction of the vehicle 10, 10', and the forward cross-member 34, the lower cross-member 36, and the upper cross-member 38 are positioned normal to a longitudinal direction of the vehicle 10, 10'.

In particular embodiments, the side members 31, 32 may be cast and machined aluminum, the forward cross-member 34 may be extruded aluminum, the lower cross-member 36 may be extruded aluminum, and the upper cross-member 38 may be cast aluminum. In other embodiments, any one or more of these components may be made of any suitable material, and may be manufactured in a variety of ways.

The side members 31, 32 may be configured to couple to one or more of the upper cross-member 38, attachments 42 for a fuel tank 40, control arms 52 for a suspension system 50, and attachments 62 for an electric motor assembly 60. In various embodiments, the side members 31, 32 are configured to couple to the vehicle body frame 20. A first end of the upper cross member 38 is configured to couple to the left side member 31, and a second end of the upper cross member 38 is configured to couple to the right side member 32. The upper cross member is configured to be removably coupled (e.g. bolted) to the side members 31, 32. The components of the suspension system 50 couple (e.g., bolt) to the side members 31, 32 at machined locations to ensure dimensional accuracy.

According to various embodiments, a first end of the front cross member 34 is configured to couple to a front end of the left side member 31, and a second end of the front cross member 34 is configured to couple to a front end of the right side member 32. A first end of the lower cross member 36 is configured to couple to a portion of the left side member 31, and a second end of the lower cross member 36 is configured to couple to the right side member 32. In various embodiments, the lower cross member 36 is positioned rearward of the front cross member 34. In various embodiments, the front and lower cross-members 34, 36 are fixtured and welded to the side members 31, 32 and reinforced using gussets 72, (e.g., triangular-shaped sheet aluminum welded gussets). According to other embodiments, the front and lower cross-members 34, 36 are configured to be coupled to the side members 31, 32 with fasteners (e.g. rivets, bolts).

Figure 3:
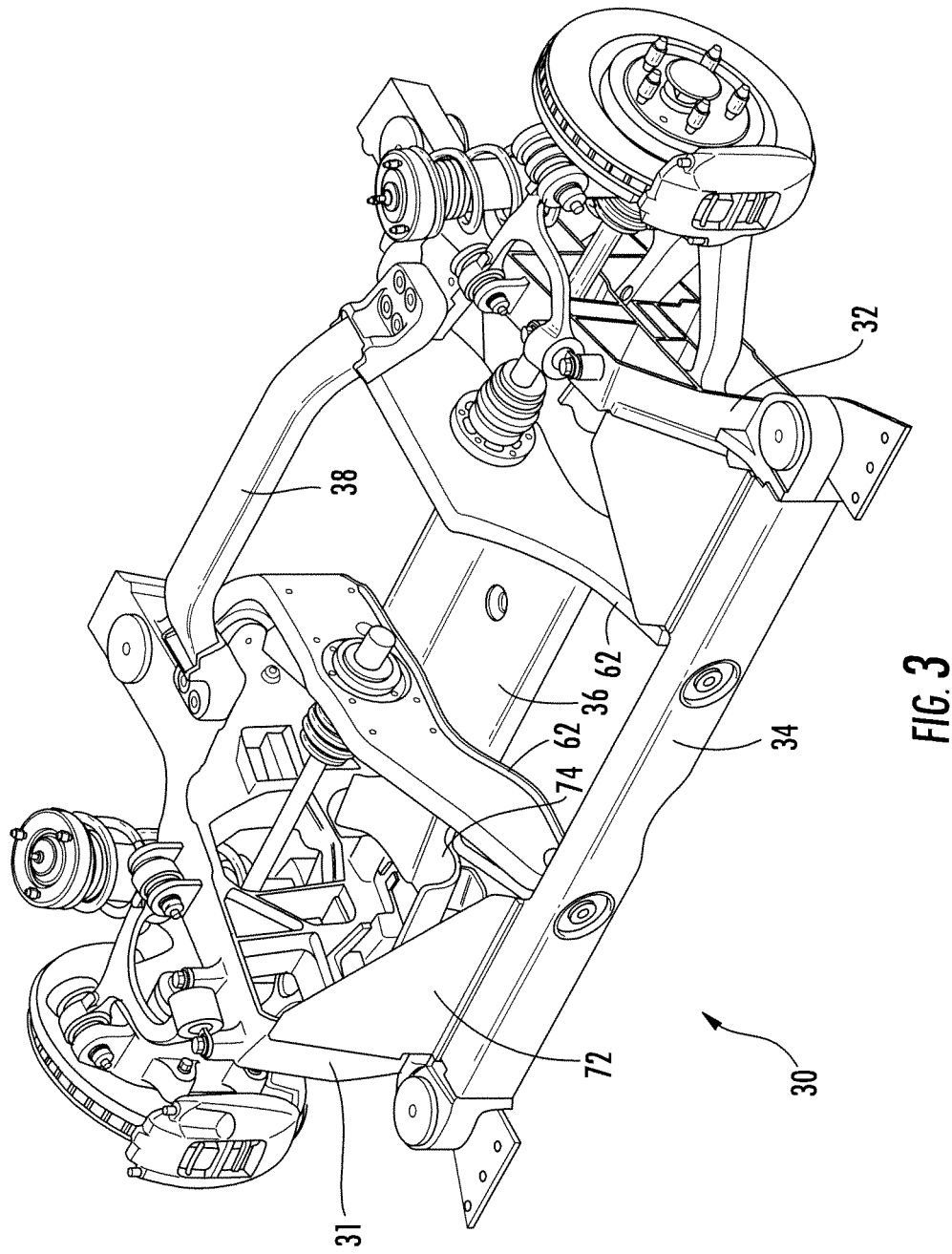
FIG. 3 is a front perspective view of a rear subframe assembly without powertrain components according to an embodiment of the disclosure.
Figure 4:
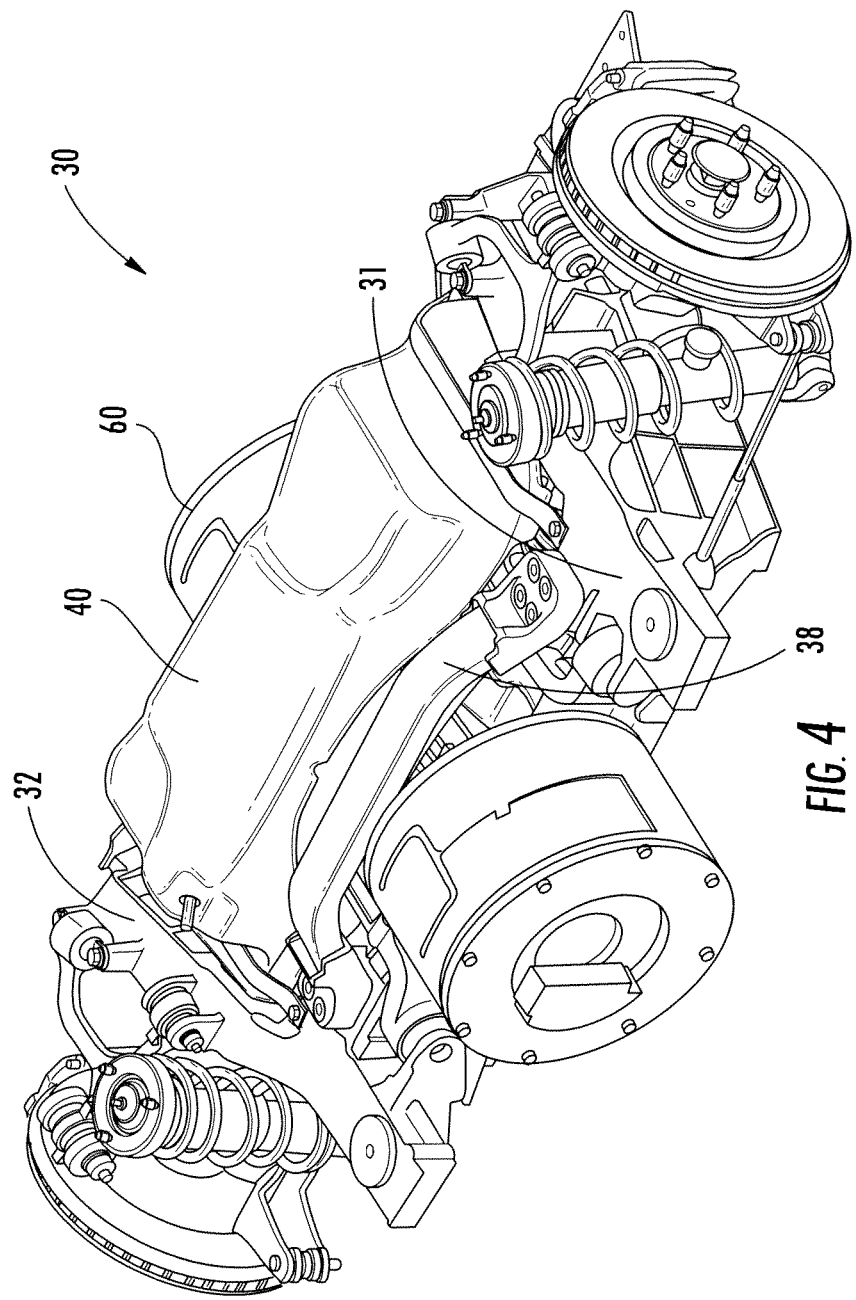
FIG. 4 is a rear perspective view of a rear subframe assembly with powertrain components according to an embodiment of the disclosure.
Figure 5:
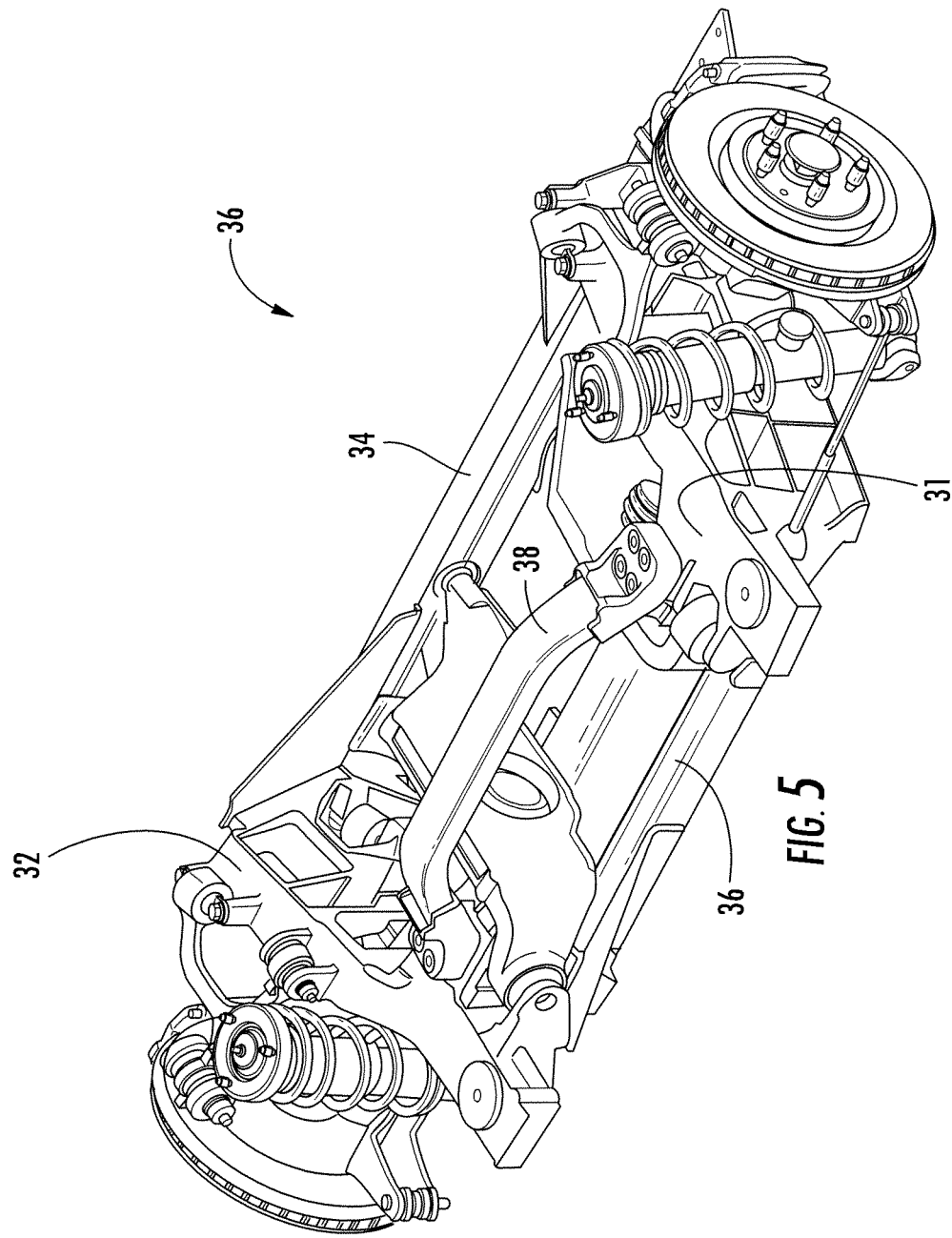
FIG. 5 is a rear perspective view of a rear subframe assembly without powertrain components according to an embodiment of the disclosure.
Figure 6:
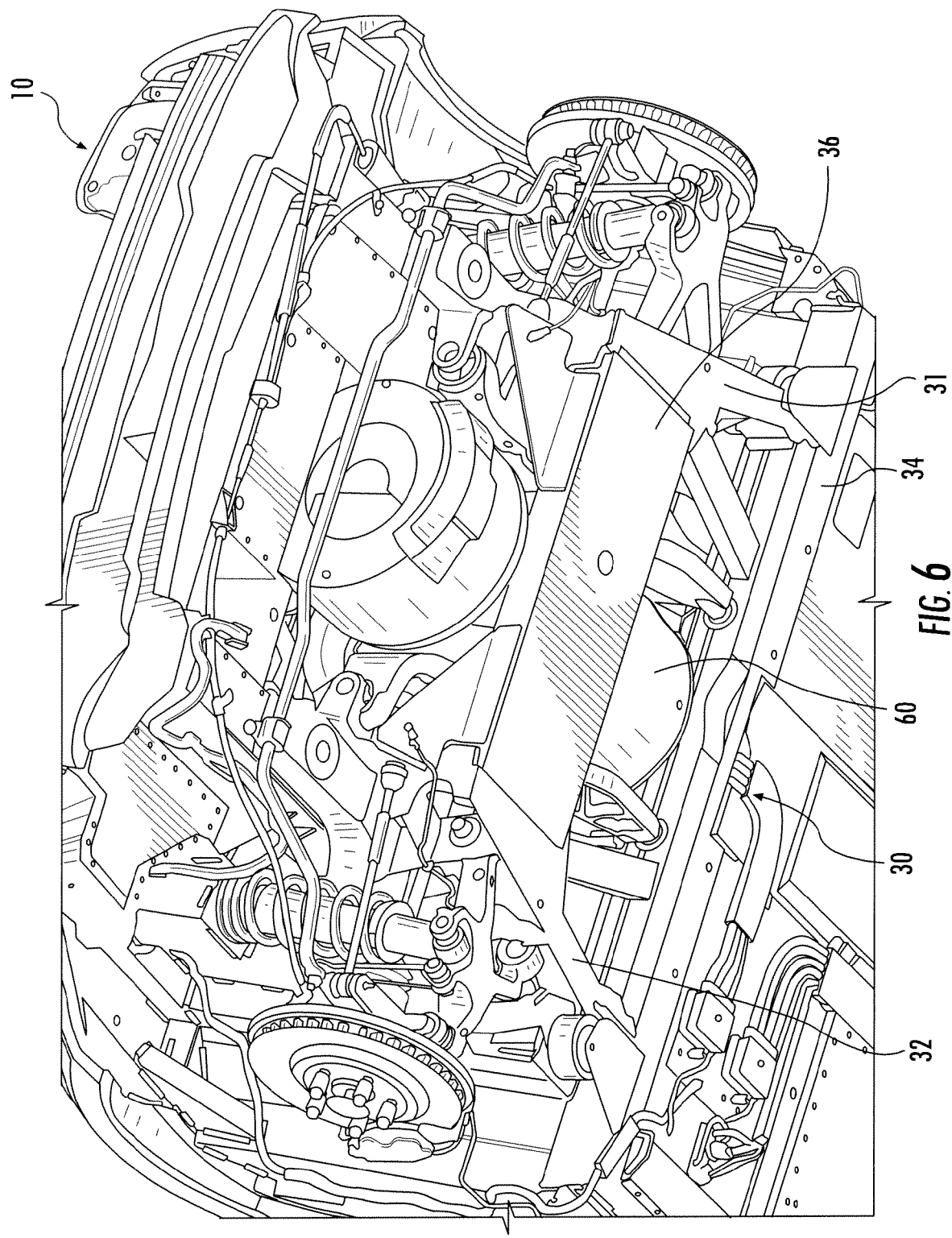
FIG. 6 is a rear bottom view of a rear subframe assembly decked into a vehicle according to an embodiment of the disclosure.
Figure 9:
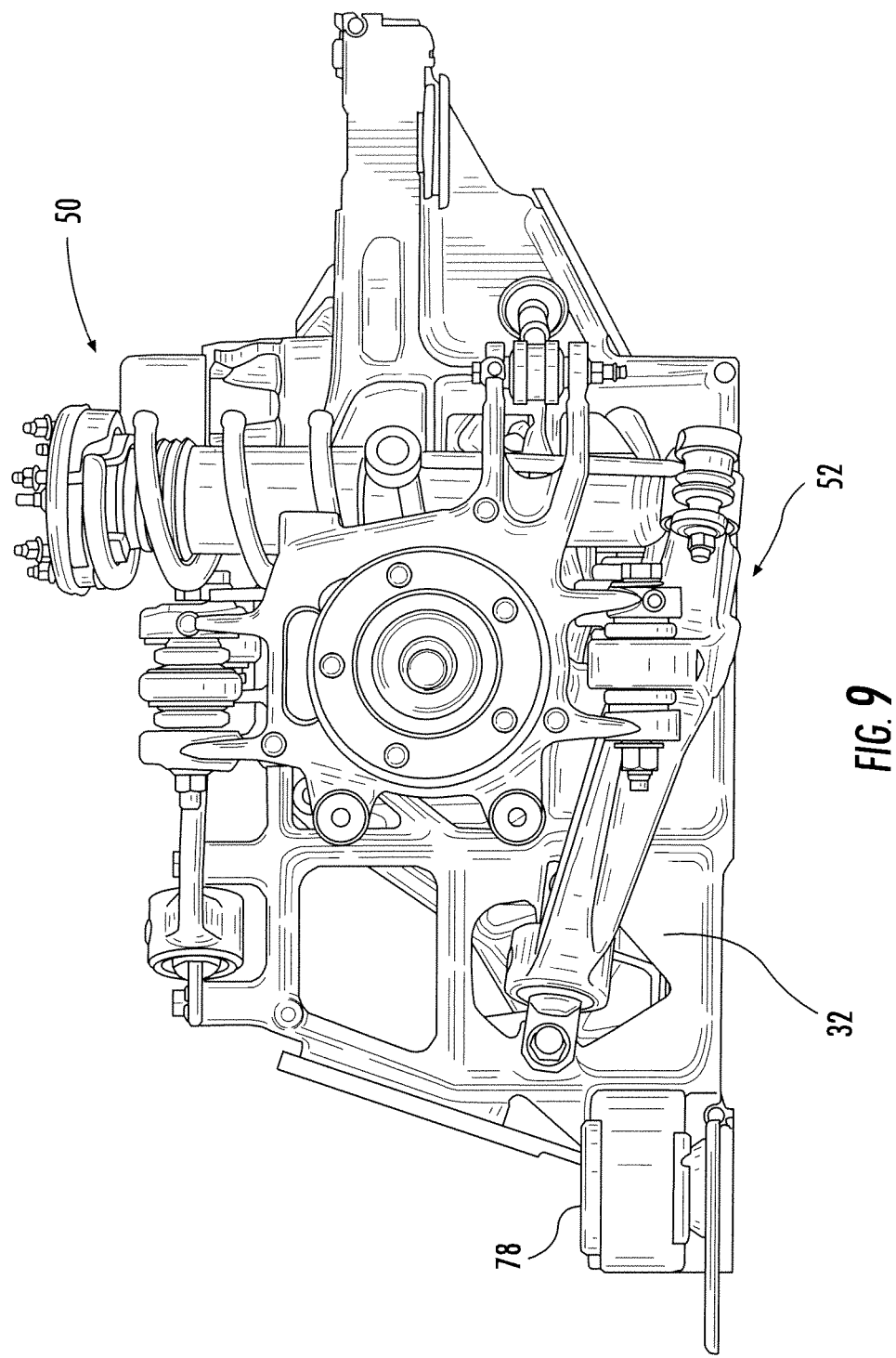
FIG. 9 is a left side view of a rear subframe assembly according to an embodiment of the disclosure.
Figure 10:
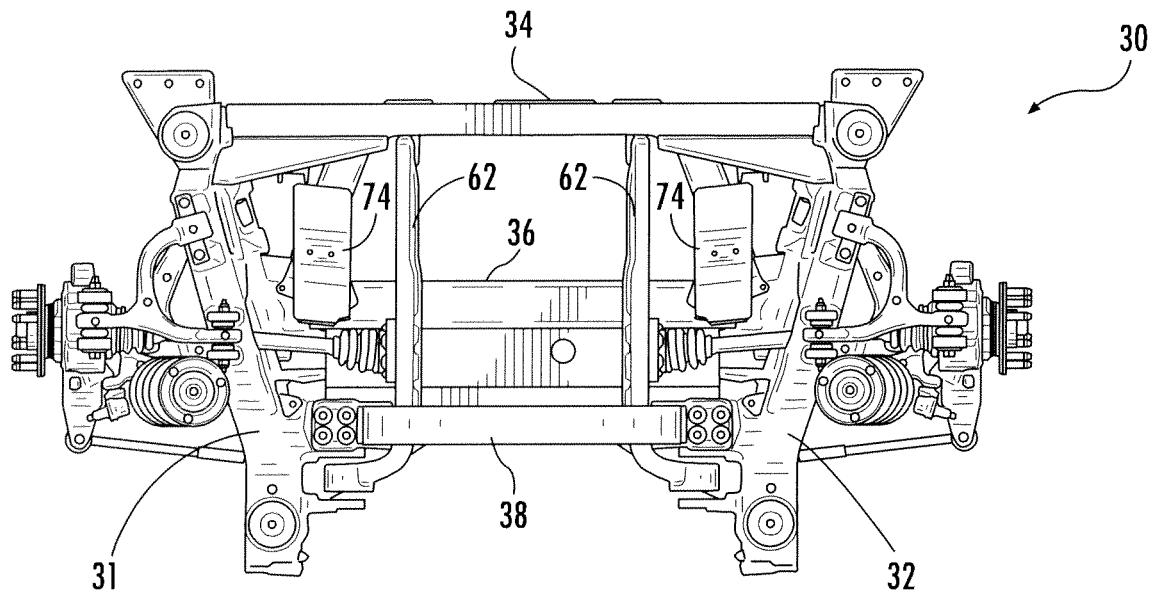
FIG. 10 is plan view of a rear subframe assembly according to an embodiment of the disclosure.
Figure 11:
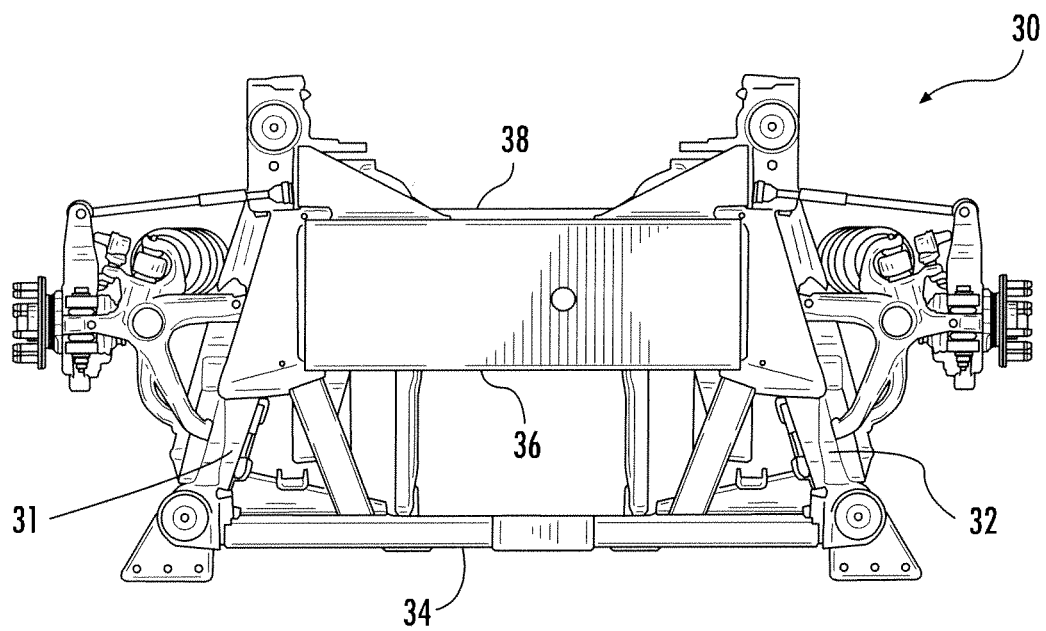
FIG. 11 is a bottom view of a rear subframe assembly according to an embodiment of the disclosure.
Figure 12:
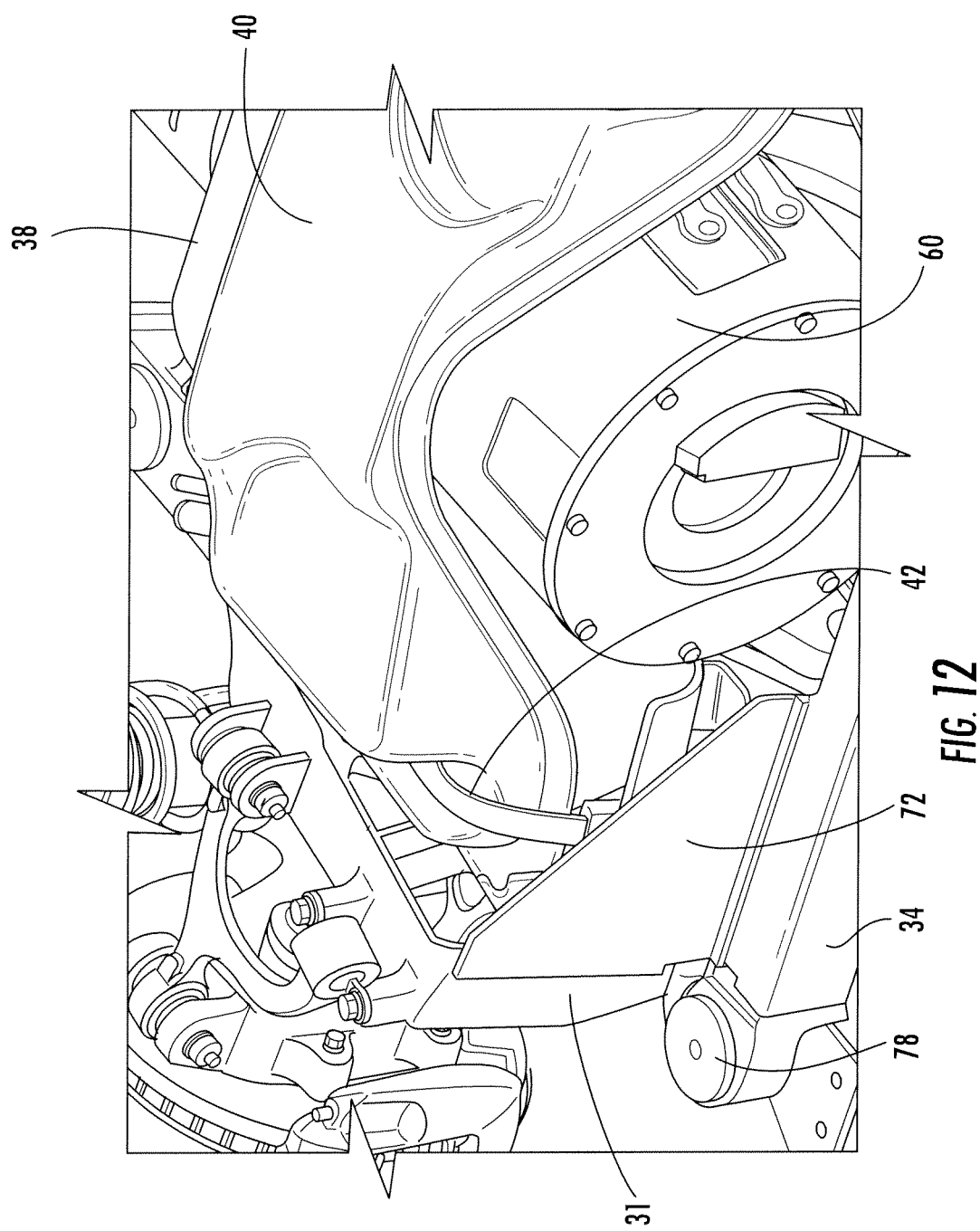
FIG. 12 is a perspective view of a rear subframe assembly with a fuel tank attachment according to an embodiment of the disclosure.

As shown in FIG. 3, the rear subframe assembly 30 may include a concave lower bracket 74 for receiving the fuel tank 40. The fuel tank 40 may be secured to the rear subframe assembly 30 with the attachments 42. For example, the attachments 42 may be coupled to a corresponding gusset 72 and a corresponding side member 31, 32. In various embodiments, the fuel tank 40 is at least partially disposed above the electric motor assembly 60.

Figure 13:
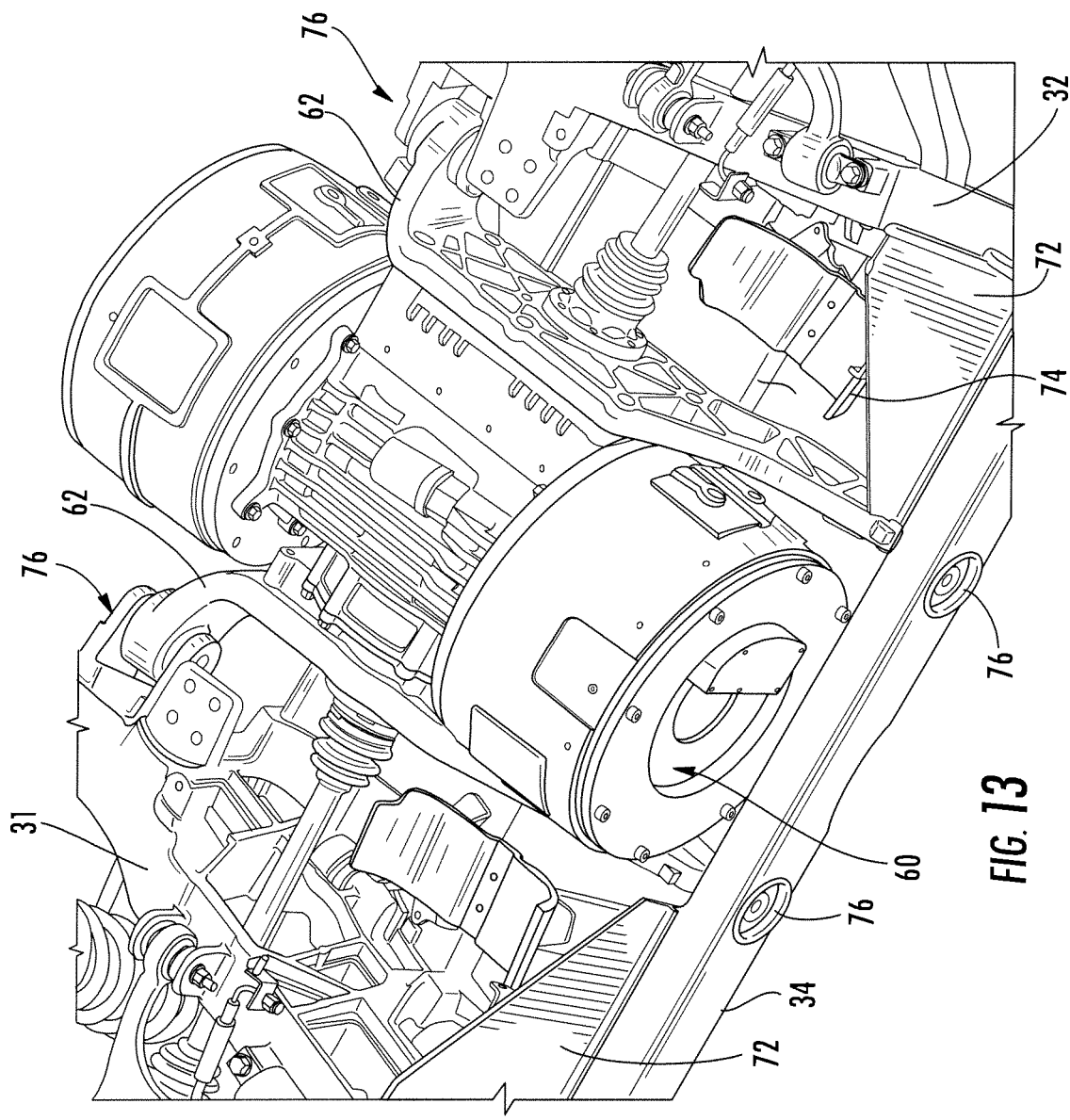
FIG. 13 is a perspective view of a rear subframe assembly with an electric motor attachment according to an embodiment of the disclosure.

As shown in FIG. 13, the electric motor assembly 60 may attach to the rear subframe assembly 30 via the attachments (or motor brackets) 62 that couple (e.g., bolt) to a left and a right side of an electric motor housing. The attachments 62 are configured to be coupled to the rear subframe assembly 30 through four motor mounts (e.g. longitudinal rubber isolators) 76. For instance, at least one isolator 76 may be coupled to the forward cross-member 34 and at least one isolator may be coupled to a corresponding side member 31, 32.

Figure 2:
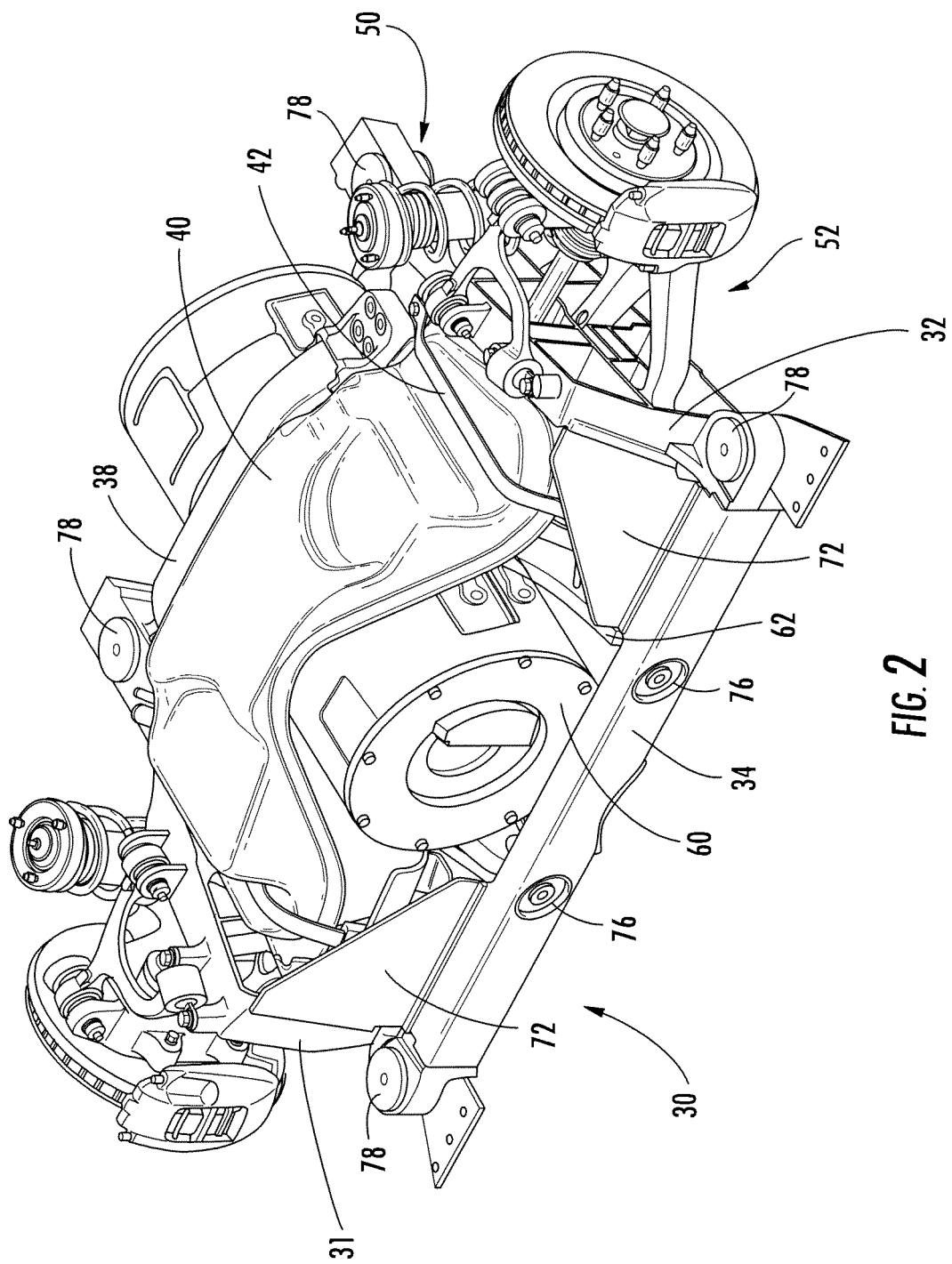
FIG. 2 is a front perspective view of a rear subframe assembly with powertrain components according to an embodiment of the disclosure.

As shown in FIG. 2, the rear subframe assembly 30 may be isolated using four traditional pressed-in voided bushings 78 with bolted attachment to body structural rails of the vehicle frame body. In other embodiments, the rear subframe assembly 30 may be isolated to the vehicle frame body in any suitable manner.

In various embodiments, the electric motor assembly 60 is isolated from vibration relative to the body structure at two levels. In particular embodiments, the electric motor assembly 60 is isolated from vibration with two levels of rubber mounts relative to the body structure: a first level at the attachments 62 and a second level at the bushings 78. In particular embodiments, the fore-and-aft and left-right distances between the isolators 76 at the attachments 62 to the rear subframe assembly 30 are maximized. The greater distances between isolators 76 provides a competitive level of driveline isolation (e.g., noise, vibration, harshness, etc.) compared to other rear-wheel-drive vehicles. The rigid attachment of the fuel tank 40 to the rear subframe assembly 30 allows for greater clearances between the fuel tank 40 and other components of the vehicle which accommodates a larger fuel tank having greater achievable fuel volume. Another benefit of a rigid attachment of the fuel tank 40 to the rear subframe assembly 30 is that relative motion between vehicle components is minimized which provides added protection of the fuel tank 40 during rear crash events.

In various embodiments, the rear subframe assembly 30 accommodates a large overall static weight of the sub-assembly (e.g., >850 lbs), high stiffness targets (e.g., approximately 100 Hz first torsional mode), and large dynamic loads from suspension attachments during real-world events, such as pothole impacts, and the like. In some embodiments, the rear subframe assembly 30 permits significant sub-assembly of most rear chassis components, and simplifies the assembly decking operation. In various embodiments, the rear subframe assembly 30 incorporates an isolated electric motor assembly 60 and a non-isolated fuel tank 40.

The previous description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

What is claimed is:

1. A rear subframe assembly for a vehicle, the rear subframe assembly comprising:
    a first side member, a second side member, a front cross member configured to be coupled to the first and second side members therebetween, a lower cross member configured to be coupled to the first and second side members therebetween, and an upper cross member configured to be coupled to the first and second side members therebetween;
    a first gusset coupled to the first side member and the front cross member and a second gusset coupled to the second side member and the front cross member, the first and second gussets for reinforcing joints between the first and second side members and the front cross member;
    a motor mount portion located between the first and second side members, the motor mount portion having a first motor bracket coupled to the front cross member through an isolator and to the first side member through an isolator, and a second motor bracket coupled to the front cross member through an isolator and to the second side member through an isolator, the first and second motor brackets configured to couple a motor thereon, the isolators for isolating the motor from vibration; and
    a fuel tank mount that is configured to support a fuel tank;
    wherein the position of the front cross member, the upper cross member, and the lower cross member is generally in a direction normal to the position of the side members; and
    wherein the fuel tank mount is disposed above the motor mount portion.

2. The rear subframe assembly of claim 1, wherein the fuel tank is coupled to the rear subframe assembly by at least one strap.

3. The rear subframe assembly of claim 1, wherein the subframe assembly is coupled to a vehicle frame as a separate assembly.

4. The rear subframe assembly of claim 1, further comprising an upper control arm and a lower control arm that are configured to be coupled to one of each side member.

5. The rear subframe assembly of claim 1, wherein a portion of the fuel tank mount that provides support for the fuel tank is concave.

6. The rear subframe assembly of claim 1, wherein the motor is configured to be mounted between the lower and upper cross members.

7. A rear subframe assembly for a vehicle, the rear subframe assembly comprising:
    a first and second side member;
    a front cross member, a lower cross member, and an upper cross member configured to be coupled to the first and second side members therebetween;
    wherein the front cross member and the side members each include at least one motor mount thereon;
    wherein a motor is configured to be coupled to the motor mounts included on the front cross member and the side members;
    wherein the position of the front cross member, the upper cross member, and the lower cross member is generally in a direction normal to the position of the side members; and
    wherein a fuel tank is configured to be disposed above the motor.

8. The rear subframe assembly of claim 7, wherein the motor mounts are configured to isolate the motor from vibration.

9. The rear subframe assembly of claim 7, further comprising a fuel tank mount that is configured to support the fuel tank;
    wherein a portion of the mount that provides support for the fuel tank is concave.

10. The rear subframe assembly of claim 7, further comprising a first motor bracket and a second motor bracket;
    wherein the motor is configured to be coupled between the motor brackets; and
    wherein a front portion of each motor bracket is coupled to a motor mount on the front cross member, and a rear portion of the motor bracket is coupled to a motor mount on one of each side member.

11. The rear subframe assembly of claim 7, wherein the fuel tank is coupled to the rear subframe assembly by at least one strap.

12. The rear subframe assembly of claim 7, wherein the subframe assembly is coupled to a vehicle frame as a separate assembly.

13. The rear subframe assembly of claim 7, wherein the motor is configured to be mounted between the lower and upper cross members.

14. A method for assembling a rear subframe assembly, the method comprising:
    coupling one end of each of a front cross member and a lower cross member to either of a first side member and a second side member, so that the position of each cross member is generally normal to the side members;
    coupling a first motor bracket to the front cross member and the first side member, and coupling a second motor bracket to the front cross member and the second side member;
    coupling a motor to the first motor bracket and the second motor bracket therebetween;
    coupling an upper cross member to the first and second side members, so the upper cross member is disposed on an opposite side of the motor as the lower cross member; and
    coupling a fuel tank to either of the side members, the motor brackets, or the upper cross member, so the fuel tank is disposed on an opposite side of the motor as the lower cross member.

15. The method of claim 14, the method further comprising coupling the side members to a structure of a vehicle.

* * * * *